United States Patent [19]

Kurgan

[11] Patent Number: 4,828,497

[45] Date of Patent: May 9, 1989

[54] GRAPHIC ART SKILL DEVELOPMENT PUZZLE KIT

[76] Inventor: Rosemary D. Kurgan, 8543 N. Ottawa Ave., Niles, Ill. 60648

[21] Appl. No.: 121,173

[22] Filed: Nov. 16, 1987

[51] Int. Cl.$^4$ .................. G09B 11/00; B43L 13/20
[52] U.S. Cl. ............................. 434/96; 434/81; 434/87; 273/157 R
[58] Field of Search .............. 434/81, 87, 96, 97; 273/157 R

[56] References Cited

U.S. PATENT DOCUMENTS

| | | | |
|---|---|---|---|
| 1,063,472 | 6/1913 | Schultz | 434/81 X |
| 1,125,423 | 1/1915 | Wiley | 434/96 |
| 1,205,386 | 11/1916 | Perenyl | 434/87 X |
| 1,425,245 | 5/1922 | Kennedy | 273/157 R |
| 1,480,458 | 1/1924 | Mershon | 434/96 X |
| 1,942,339 | 1/1934 | Lawrence | 434/96 |
| 3,364,598 | 1/1968 | Cook | 434/87 X |
| 3,574,017 | 4/1971 | Kass | 434/81 X |
| 3,581,882 | 6/1971 | Bish | 434/81 X |
| 4,373,730 | 2/1983 | Koltz | 434/96 X |

Primary Examiner—William H. Grieb
Attorney, Agent, or Firm—Charles F. Lind

[57] ABSTRACT

The disclosed graphic art puzzle kit has a durable plastic base form templet sized the same as a specific graphic art design, and a plurality of smaller templets that represent different colored or shaped components of the design. Markings on the templets instruct the user what color media to use when tracing the templet to duplicate the templet shape on the media; and the user may then cut out these media pieces. Line markings on the base form templet also illustrate the shape and location of all of the component templets. Each of the smaller component media pieces is properly located when one or more of its outer edge(s) is in registry with one or more outer edge(s) of the base form media piece. A full size visual aid picture is also in the kit, and it illustrates the completed graphic art design in color. The user may then use the base form templet markings and/or the visual aid picture to guide where to overlay the smaller component media pieces onto the base form media piece and/or on another smaller component media piece, to complete the graphic art puzzle.

8 Claims, 3 Drawing Sheets

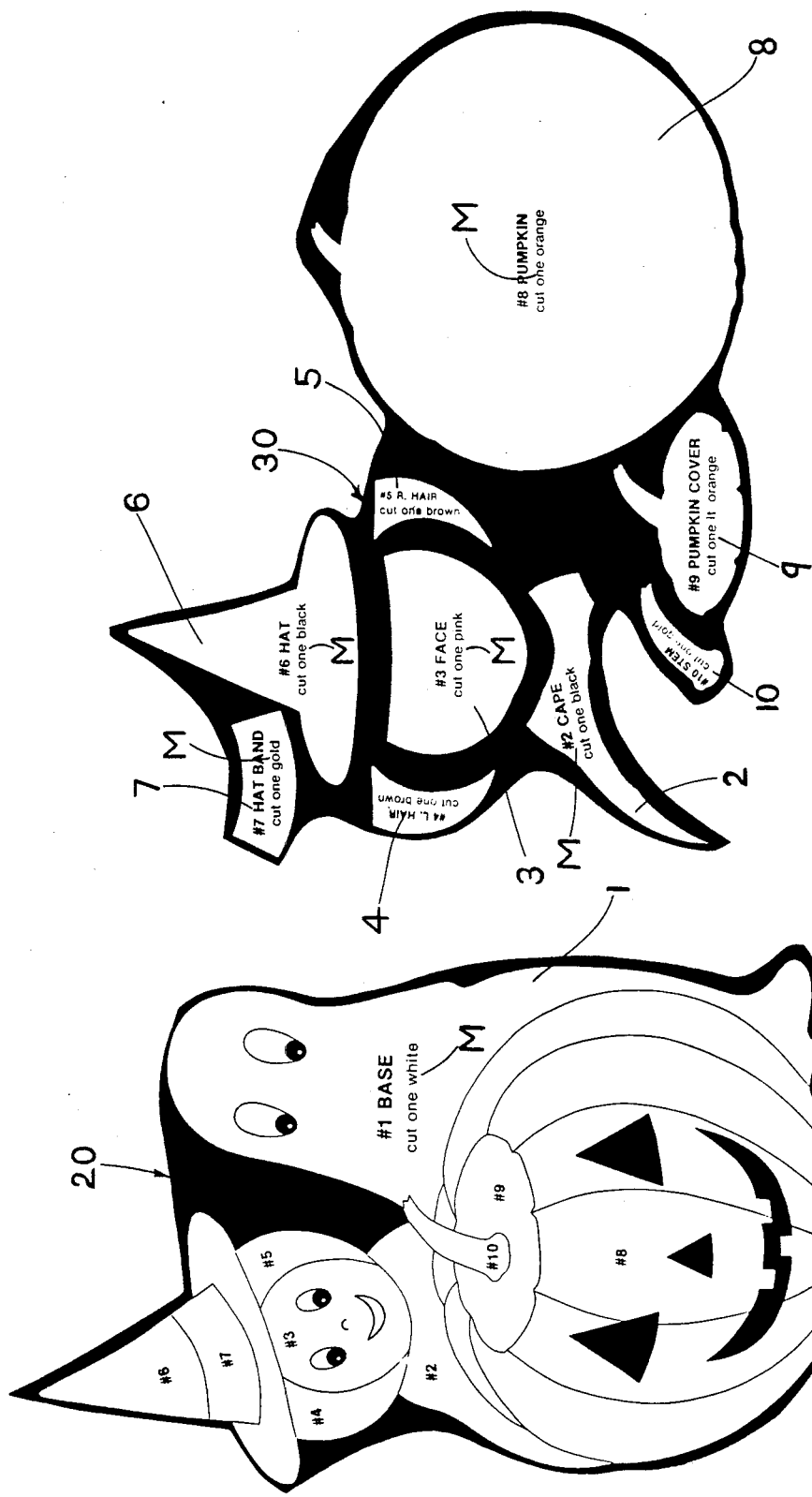

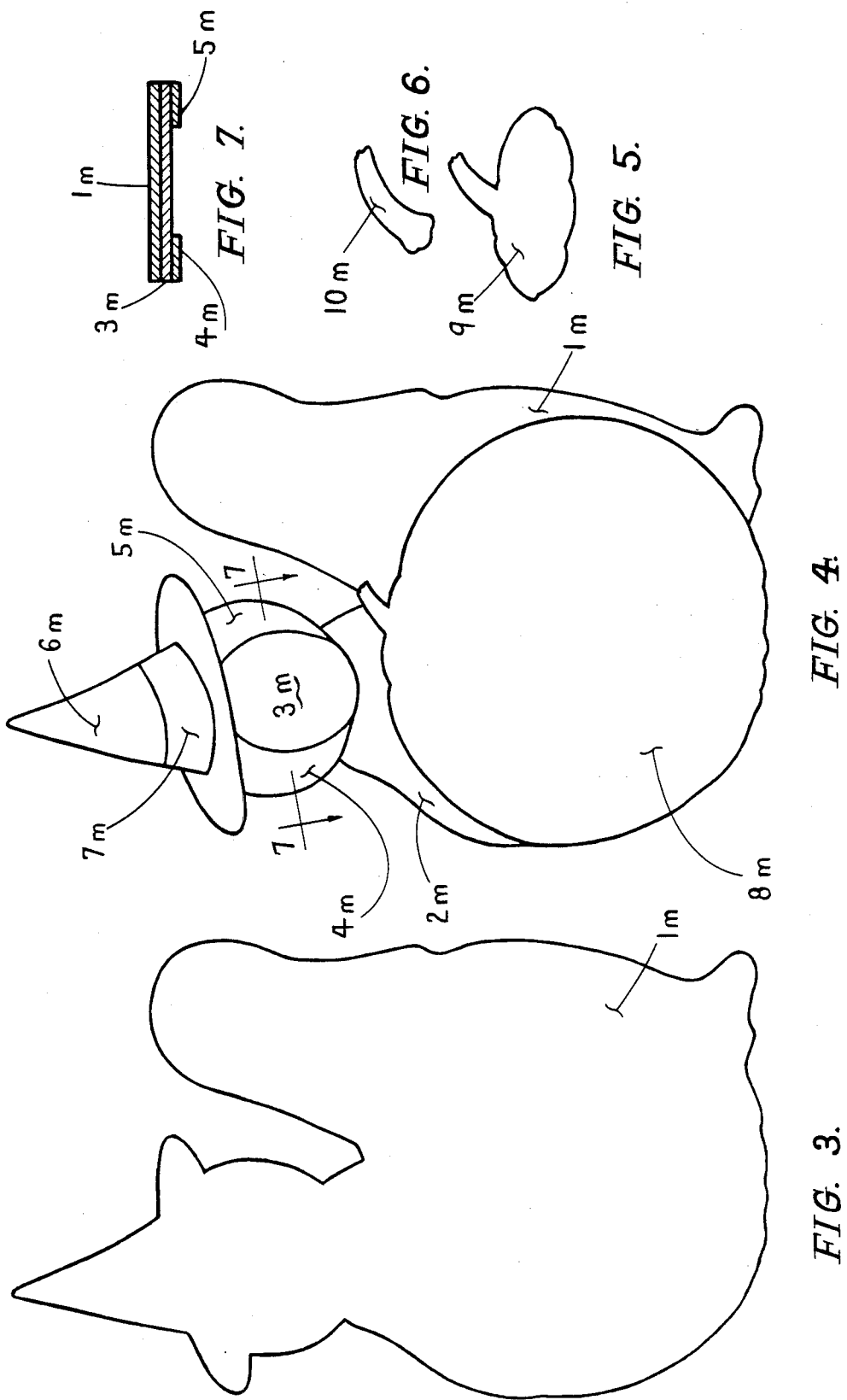

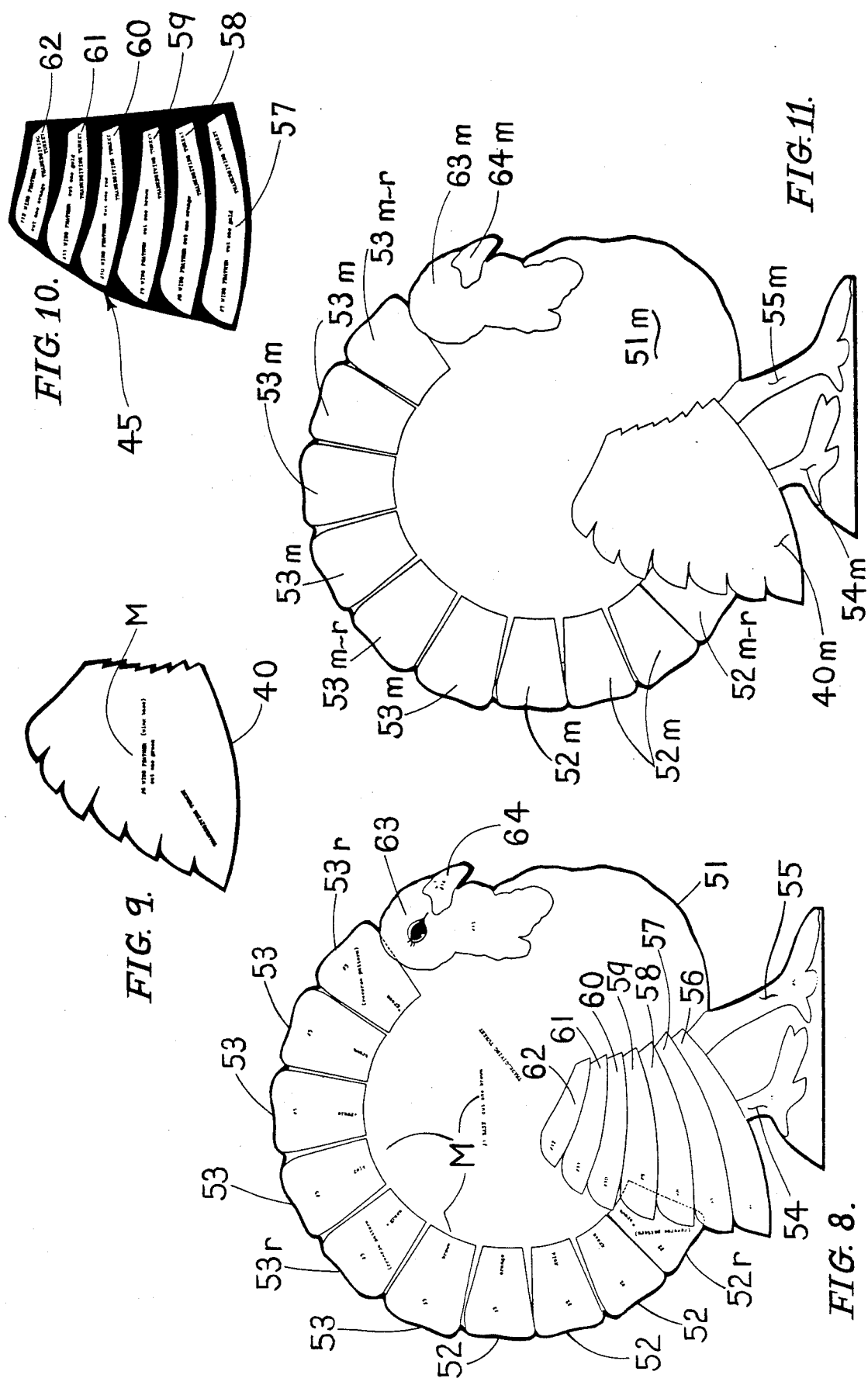

GRAPHIC ART SKILL DEVELOPMENT PUZZLE KIT

BACKGROUND OF THE INVENTION

It is common to use graphic art and/or puzzle devices for entertaining, teaching or self motivating children, senior citizens or the like. One such graphic art device may be in the nature of a durable templet that is used to trace its shape onto a construction paper or the like media, which paper media then may be cut along the tracing to form a paper piece of approxiamtely the same shape and size as the templet. One such puzzle device may have many separate parts that have to be fitted together according to some unique format, to yield a finished product and/or overall design distinguishable from the separate pieces.

SUMMARY OF THE INVENTION

This invention combines the benefical and enjoyable features of both graphic art and puzzle devices, for entertaining, teaching or self motivating its user, of any age but typically a young child or student.

This invention utilizes a base form templet sized the same as the selected graphic art design, and several smaller component templets that represent different colored parts of or features on the design. A full size visual aid picture illustrates the graphic art design in color. Markings on the templets instruct the user what color construction paper or other media to use when tracing the templet to duplicate the templet shape on the media. The user may cut out all of these media pieces. Line markings on the base form templet also illustrate the graphic art design, by duplicating the different shapes and locations of the component templets. The user may then use both the base form templet markings and the visual aid picture as guides or modes of instruction where to overlay the smaller component media pieces onto the base form media piece or possibly on another smaller media piece, to complete the graphic art puzzle. Each of the smaller media pieces is properly located when one more of its outer edge(s) is in registery with one or more outer edge(s) of the base form media piece.

The invention may serve as a self motivated learning aid for the user or student, by discriminating both according to colors and shapes, by sharpening visual and positional perceptions, by developing eye/hand coordination and small motor skills, and by demanding that one follow instructions and/or act only according to some sequential manner. The designs may introduce the use of negative and positive space perspectives and the use of shapes to form the composition.

The invention kit may be economically made, to allow a parent, teacher or the like to possess and use several related kits, each illustrating a special event or theme, thereby providing a stimulus for talking about the project, for sharing with and helping one another in a class/community atmosphere, and for enjoying art while sharpening manual skills.

BRIEF DESCRIPTION OF THE DRAWINGS

The invention will be more fully understood and appreciated after reviewing the following specification, which includes the drawings identified as:

FIG. 1 is a plan view of a pattern having therein a base form templet used in the kit making up a first example of the invention;

FIG. 2 is a plan view of a pattern having other smaller and separate component templets used in the kit making up the first example of the invention illustrated in FIG. 1;

FIG. 3 is a plan view of a media piece formed from the templet of FIG. 1;

FIG. 4 is a plan view of the media piece of FIG. 3, in part covered by some of the media pieces formed from the templets of FIG. 2 being positioned in place thereon, in a partly completed sequence of finishing the graphic-art puzzle of the first example of the invention;

FIGS. 5 and 6 are plan views of the last media pieces that must be put in place on the partly completed graphic art puzzle of FIG. 4;

FIG. 7 is a sectional view as seen generally from line 7—7 in FIG. 4;

FIGS. 8 and 9 are plan views of main and secondary base form templets used in a kit making up a second example of a graphic art puzzle incorporating the teachings of the invention;

FIG. 10 is plan view of one pattern used in the second example of the invention, and having therein separate wing component templets adapted to make media pieces to be used with the base form media piece formed from the templet of FIG. 9; and FIG. 11 is a plan view of the main base form media piece formed from the templet of FIG. 8, in part covered by some of the media pieces formed from templets not illustrated in the drawings in a partly completed sequence of finishing the graphic-art puzzle of the second example of the invention, and also showing the secondary base form media piece formed from the templet of FIG. 9 in place thereon.

DETAILED DESCRIPTION OF THE INVENTION

The invention may best be practiced by means of a kit having a set of patterns; a visual aid picture; a teacher's information and instruction sheet; an assembly instruction and diagram sheet; and a plastic storage bag. The specific puzzle illustrated in FIGS. 1-7 is a graphic-art design of a Halloween theme, having a pumpkin in the foreground and having a witch and a ghost partly hidden by and behind the pumkin; while FIGS. 8-11 illustrate a puzzle kit of the Thanksgiving Holiday theme, having a plump and colorful turkey.

The set of patterns 20 and 30 is illustrated in FIGS. 1 and 2 as two sheets of heavy grade durable plastic, such as 35 gauge High Density Polyethylene, and templets are die-cut from the patterns and identified as the base form templet and smaller component templets used in making up the media pieces comprising the particular graphic-art puzzle. Thus, the pattern 20 of FIG. 1 yields a single templet (numbered 1 on the illustrated drawing), while the pattern 30 of FIG. 2 yields templets 2-10. The separate templets 1-10, being die-cut in the patterns 20 or 30, can be easily popped out or removed from the patterns, and when not in use may be stored in the plastic storage bag (not shown) provided in the kit. The patterns 20 and 30, without the removed templets 1-10, may also be saved and used to outline the same base form and smaller pieces.

Each of the templets 1-10 is the actual size and exterior shape of one of the many media pieces to be made and used in forming the intended graphic art puzzle.

Each templet 1–10 is marked with its identifying name and number as shown at "M" on the templets. The marking "M" also includes a color-coding to direct what color media to use when tracing out the shape of that particular templet on the media. The colors used for the different media would of course be determined by what is available and by the component or feature of the graphic art design that is to be formed with the piece.

For example, the illustrated graphic art design may include a white media for the base form 1, a black media for the witch's cape 2 and hat 6, a pink media for the face 3, brown media for the hair 4 and 5, a gold media for the hat band 7 and punkin stem 10, and different shades of orange media for the pumkin 8 and punkin cover 9. Moreover, line markings are provided across the interior of the base form templet 1, indicating the desired end positions and numbers of each separate component templet 2–10 used in the design. These line and/or other markings "M" may be printed, as by silk-screening, on the separate respective templet.

The visual aid picture (not shown) is preferably made on a heavy grade enamel paper stock to be saved and reused, and is but an actual size printed color picture of the graphic-art design. The visual aid picture will thus be similar in size and shape to the base form templet 1 of FIG. 1, except it will provide the demarcation between the separate component pieces of the graphic-art puzzle only by the color contrast. The visual aid picture thus will not have any markings "M" thereon identifying the names or numbers or location thereon of the media pieces, as such markings are on the base form templet 1.

The templets 1–10 are used by first tracing their shape onto the media to be used to form the graphic art puzzle. Common construction paper is ideal as it available in many colors and thickness, is easy to mark on and cut, the cut media pieces are relatively durable and easy to handle and locate in working the puzzle, and is relatively economical. As noted, color-code markings "M" on each templet will indicate what color construction paper to use with that templet. After the templates have been traced, the marked media would then be cut along the tracings to provide separate media pieces 1m–10m of the same size and shape as each templet 1–10 respectively. For stability, the base form piece 1m may be made of a heavier and more durable media than used for making the other component or feature forming media pieces 2m–10m.

Each of the separate smaller component or feature forming pieces 2m–10m, when formed according to its master templet 2–10 respectively, will have one or more outer edge(s) that must be brought into registry with one or more exterior edge(s) of the properly formed base form piece 1m, and one or more other outer edge(s) that must be brought into registry with one or more outer edge(s) of its adjacent smaller piece(s) 2m–10m, to locate the smaller component or feature forming pieces 2m–10m exactly relative to each other and relative to the base form piece 1m, to produce the particular graphic art illustrated. This is apparent for most media pieces, but the face 3m, pumpkin cover 9m, and stem 10m are of particular interest.

Thus, the media face piece 3m registers at its outer edges with the adjacent outer edges of the media base form piece 1m; and the media hair pieces 4m and 5m have outer edges that also register with the same outer edges of the base form piece 1m; and these hair pieces are layered on part of the face piece (as is illustrated in FIG. 7). This layering of the media pieces 3m, and 4m and 5m, for example, requires that these pieces would have to be assemblied sequentially, from the lower numbered pieces up. This is true also with the layering of the media pumkin piece 8m, pumpkin cover piece 9m and punkin stem piece 10m sequentially on the base form piece 1m, or one another.

It must be remembered that the media pieces 1m–10m will not have any markings "M" (numbers or color-coding, etc) on the exposed side when they are positioned and secured in place; but the pieces will or should be sized and shaped, and formed of media of the color instructed according to the corresponding numbered templet. However, the user or student may find it advantageous to number the underside of the media piece as it is being cut. However, when assembling the separate pieces 1 m–10 m of the puzzle, the student may make separate or combined use of the marked base form templet 1 and the colored visual aid picture (not shown), to help locate the pieces 2m–10m properly on the base form piece 1m. Thus, the marked templet 1 records all the intended sequencing and positions of the component puzzle pieces, contrasting by shape only, while the visual aid contrasts the separate features or components in color only, providing a color sensitive mode of guidance for having the student complete the puzzle.

Glue could be used on the underside of each media piece when it has been properly located, before and for the purpose of permanently securing it to the underlying base form or component forming media piece.

When the media pieces 1m–10m are positioned properly, the finished puzzle will correspond generally to the visual aid; although the degree of accuracy in making and locating the separate pieces may of course modify the exactness of the duplication. The eyes, nose and mouth of the graphic art design may be added individually by the student, such as by a pencil, colored marker, or by gluing another layer of media onto the exposed side of the media, to finish the graphic art puzzle.

It is to be noted that some of the designs shapes are formed, not by adding or overlaying a media component piece, but by allowing the color of the media base form piece 1m to produce the desired shape and color after the other pieces 2m–10m have been positioned in place. This negative space form of illustration is used for example, to form the body of the ghost, when all of the other colored media pieces 2m–10m have been assemblied in place, to leave only that designated portion of the media base form piece 1m yet uncovered.

The same disclosed concept may be used to form more complex graphic art designs, such as is illustrated in FIGS. 8–11, as a turkey. The main base form templet 51 is illustrated in FIG. 8, and has markings "M" thereon indicating the shape, color and properly assemblied location of perpherial feather pieces made from just two peripherial feather templet illustrations (like 52 and 53, although the templets are not actually being shown).

An actual templet like illustration (52) may be used to form all of the peripherial feather pieces 52m, which will be shaped the same; and an actual templet like illustration (53) may be used to form all of the peripherial feather pieces 53m, which will be shaped the same. However, these templets (like illustrations 52 and 53) are not symmetrical, so that a slightly different mirror image shape is obtained from the same piece 52m or 53m when it is reversed or flipped over and placed on the media base form piece 51m with the side, normally exposed on the other like pieces 52m or 53m, against the base form piece. This is illustrated as templet illustrations (52r and 53r) in FIG. 8, and as media pieces 52m-r and 53m-r in FIG. 11, and serves to allow for the circula overall contour of the peripheral wings.

Also, a secondary base form templet 40 (FIG. 9) may be provided to trace out and make its associated base form piece 40m (see FIG. 11). The secondary base form piece 40m would have one or more outside edge(s) adapted to register with one or more outside edge(s) of the turkey base form 51m, particularly at the lower edges of the wing feathers. The pattern 45 (illustrated in FIG. 10) provides for pop-out die-cut separate wing templets 57, 58, 59, 60, 61 and 62, that could be used to yield actual wing feather media pieces (not shown) of corresponding size and shape. The separate wing feather media pieces (not shown) would have one or more outer edge(s) adapted to be brought into registry with one or more exterior edge(s) of the properly formed secondary base form piece 40m. This allows each feather piece to be properly located by registry at an exterior edge of the secondary base form, that otherwise would be at an interior location of the main base form spaced from all of its outer edges.

The shape and assemblied location of feet pieces 54m and 55m made from templets like illustrations (54 and 55), of wing feather pieces (not shown) made form templets 56-62 (see FIG. 10), of head and neck piece 63m made from a templet like illustration (63), and beak piece 64m made from a templet like illustration (64), are also illustrated on the templet 51.

Note also that there is no wing feather media piece to cover the templet illustration (56) on FIG. 8. Instead, the secondary media base form piece 40m will be visible and show, as another example of a negatively defined space perspectives to form the image.

The main base form piece 51m may be made of a brown poster board. The peripherial feather pieces 52m and 53m may be of construction paper in different colors including brown, green, gold and orange. The feet 54m and 55m neck and head 63m, and beek 64m may be of other appropriately colored construction paper.

Although construction paper or poster board has been mentioned as a media commonly used to practice the invention, other media may be used instead. Thus, a sheet of a felt/cloth, of wood, of stained glass or needle point and/or cross stitch pattern may be used. Also, by using only the visual aid and/or some of the templets and correspondingly formed media pieces, the graphic art project can become a drawing exercise, using colored pencils or paint, charcoal, pastels or the like, to add to the creativity of the project. The accuracy of the finished puzzle may be checked by overlying the main base form templet on the completed design.

One aspect of this invention is that it may be used as a learning tool for all ages to improve small motor skills, but it may be particularly useful and popular with young children. Accordingly, the templets and correspondingly formed media pieces may be made of sizes suitable for small hands to handle, where for example the overall size of the templets 20 and 30, and 51 and of the corresponding visual aids (not shown) may be $14\frac{3}{4}'' \times 17\frac{3}{4}''$ (outside dimensions). The invention also may be practiced with no mechanical measurements needed, other than tracing and cutting.

Additional original graphic art designs may be used in creating puzzles following the same disclosed concept, and may use themes such as the Seasons of the Year, Holidays, People, Caricatures, Sports, School Year, Historical Figures, Historical Events, Nature, Animals, and Current Events. Inasmuch as the overall cost of each different kit will generally be quite low, and as the plastic die-cut patterns or templets and visual aid picture are durable and reusable many times over, and may be shared even by many students at the same time, kits of these added themes could well fit within even a skimpy budget. Moreover, the consumed items, the construction paper media and glue, are typically low budget supplies . . . adding to its appeal.

The assembly instruction and diagram sheet may be $11'' \times 17''$, with black ink printed on white paper, giving written instructions and the templet diagrams of the particular graphic art design. This sheet could also be photocopied for student reference.

The teachers information and instruction sheet may be $8\frac{1}{2}'' \times 11''$, of black ink on white paper, giving more verbal benefits and uses of the invention.

The structured activity of the invention, with its hands-on approach, gives students an opportunity: to transfer what they see into something they can produce, to sharpen visual perception, reinforce color and shape identification and discrimination, and strengthens eye-/hand coordination and small motor skills. The design introduces the use of negative and positive space perspectives to form the composition. Each project can promote a class/community atmosphere of sharing and helping each other, can provide a stimulus for oral language practice, can fosters the importance of using a diagram, following instructions, and solving a problem according to a sequence of moves, and can be entertaining and rewarding to the student. The successfully completed project may be used as a wall hanging, mobile, greeting card, placemat or party decoration.

Use of the patterns can be modified according to the capabilities of the students, where more or less teacher guidance or explanation may be needed. The tracing procedure can be minimized by tracing the base form and smaller templets on master papers, which can be photocopied or dittoed directly on colored paper ready for cutting. On the other hand, the more capable students can be given only the briefest explanation of the concept, the kit components, and allowed to complete the project independently. The designs can be rendered in reverse or with other colors to increase the challenge, flexibility or creativity of the invention. The kit also minimizes preparation time for the teacher, and the monthly themes repeatedly reinforces the above skills and allows regular re-evaluation of student progress.

While only specific embodiments of the invention have been illustrated, it is apparent that variations may be made therefrom without departing from the inventive concept. Accordingly, the invention is to be limited only by the scope of the following claims.

What is claimed as my invention is:

1. A graphic art puzzle kit for developing manual skills, the combination of
   a base form templet sized and shaped the same overall as a selected graphic art design, and a plurality of smaller templets that represent component parts or features of different color or shapes contained in the graphic art design;
   each of the templets having markings thereon providing instructions of a desired media to use to make up the selected graphic art design;

each of the templets being adapted to be traced on its media, to provide that one may cut along the tracings to cut out separate media pieces corresponding to the base form templet and each of the smaller component templets;

each of the smaller component templets having markings thereon indicating the sequence one should place the corresponding smaller component media pieces on the base form media piece and/or on another smaller component media piece already in place on the base form media piece;

the base form templet having line markings thereon indicating the shape and location of each of the different smaller component templets, adapted to serve thereby as a mode of instruction in locating the smaller component media pieces on the base form media piece and/or on another smaller component media piece already in place on the base form media piece, to complete the graphic art puzzle; and each of the smaller component templets and thus the corresponding component media pieces formed therefrom having one or more outer edge(s) adapted to be brought into registery with one or more outer edge(s) on the base form templet and thus on the corresponding base form media piece formed therefrom, to provide a guide for properly locating the smaller component media pieces to form the graphic art puzzle.

2. A graphic art puzzle kit according to claim 1, wherein the base form media piece and the smaller component media pieces have no visible markings on the exposed face side thereof, to provide that the graphic art puzzle is adapted to be fitted together properly by registering the edges of these smaller component media pieces and corresponding edge(s) of the base form templet.

3. A graphic art puzzle kit according to claim 1, further including secondary base form and smaller component templets each constructed and adapted to function as the first mentioned base form templet and its smaller component templets, said secondary base form templet and the corresponding secondary base form media piece formed therefrom having formed thereon one or more outer edge(s) adapted to be brought into registery with one or more outer edge(s) on the first mentioned base form templet and thus on its corresponding base form media piece formed therefrom, to provide for properly locating the respective secondary base form media piece on the first mentioned base form media piece, and the smaller component secondary templets and the corresponding media pieces formed therefrom having one or more outer edge(s) adapted to be brought into registery with one or more outer edge(s) on the secondary base form media piece formed therefrom, to provide for properly locating the respective secondary smaller component media pieces.

4. A graphic art puzzle kit according to claim 1, wherein at least one of the smaller component media pieces overlies and partly covers another of the smaller component media pieces, in the region whereat these component pieces have a common registry with the outer edge of the media base form piece, whereby the registry of the underlying other component piece is hidden from view in the finished puzzle.

5. A graphic art puzzle kit according to claim 1, further including a generally flat visual aid illustrating the selected graphic art design in full size and shape as a two-dimensional colored picture, the visual aid being adapted to serve also as a mode of instruction in locating the smaller component media pieces on the base form media piece and/or on another smaller component media piece already in place on the base form media piece, to complete the graphic art puzzle.

6. A graphic art puzzle kit according to claim 5, further including secondary base form and smaller component templets each constructed and adapted to function as the first mentioned base from templet and its smaller component templets, said secondary base form templet and the corresponding secondary base form media piece formed therefrom having formed thereon one or more outer edge(s) adapted to be brought into registery with one or more outer edge(s) on the first mentioned base form templet and thus on its corresponding base form media piece formed therefrom, to provide for properly locating the respective secondary base form media piece on the first mentioned base form media piece, and the smaller component secondary templets and the corresponding media pieces formed therefrom having one or more outer edge(s) adapted to be brought into registery with one or more outer edge(s) on the secondary base form media piece formed therefrom, to provide for properly locating the respective secondary smaller component media pieces.

7. A graphic art puzzle kit according to claim 6, wherein the base form media piece and the smaller media pieces have no visible markings on the exposed face side thereof, to provide that the graphic art puzzle is adapted to be fitted together properly by registering the edges of these smaller media pieces and corresponding edge(s) of the base form templet.

8. A graphic art puzzle kit according to claim 7, wherein at least one of the smaller component media pieces overlies and partly cover another of the smaller component media pieces, in the region whereat these component pieces have a common registry with the outer edge of the media base form piece, whereby the registry of the underlying other component piece is hidden from view in the finished puzzle.

* * * * *